(12) United States Patent
Shkedi

(10) Patent No.: US 8,170,583 B2
(45) Date of Patent: *May 1, 2012

(54) SIGNAL COMPARISON-BASED LOCATION DETERMINING METHOD

(75) Inventor: Roy Shkedi, New York, NY (US)

(73) Assignee: Broadphone, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/720,362

(22) Filed: Mar. 9, 2010

(65) Prior Publication Data

US 2010/0159951 A1 Jun. 24, 2010

Related U.S. Application Data

(63) Continuation of application No. 11/533,238, filed on Sep. 19, 2006, now Pat. No. 7,706,811.

(51) Int. Cl.
*H04W 24/00* (2009.01)

(52) U.S. Cl. ........... 455/456.1; 455/404.1; 455/404.2; 455/433; 455/440; 455/457; 370/328; 370/331; 370/332; 370/333; 370/334

(58) Field of Classification Search ....... 455/432.1–442, 455/456.1–456.3
See application file for complete search history.

(56) References Cited

U.S. PATENT DOCUMENTS

| | | |
|---|---|---|
| 6,674,403 B2 | 1/2004 | Gray |
| 6,972,717 B2 | 12/2005 | Sollenberger |
| 7,050,786 B2 | 5/2006 | Caci |
| 7,057,556 B2 | 6/2006 | Hall |
| 7,305,245 B2 | 12/2007 | Alizadeh-Shabdiz |
| 7,403,762 B2 | 7/2008 | Morgan |
| 7,414,988 B2 | 8/2008 | Jones |
| 7,433,694 B2 | 10/2008 | Morgan |
| 7,471,954 B2 | 12/2008 | Brachet |
| 7,474,897 B2 | 1/2009 | Morgan |
| 7,493,127 B2 | 2/2009 | Morgan |
| 7,502,620 B2 | 3/2009 | Morgan |
| 7,515,578 B2 | 4/2009 | Alizadeh-Shabdiz |
| 7,551,579 B2 | 6/2009 | Alizadeh-Shabdiz |

(Continued)

FOREIGN PATENT DOCUMENTS

EP 12419093 9/2002

OTHER PUBLICATIONS

Motorola, Inc., Overview of 2G LCS Technologies and Standards (3GPP TSG SA2 LCS Workshop LCS-010019—London, UK, Jan. 11-12, 2001).

(Continued)

*Primary Examiner* — Dai A Phuong
(74) *Attorney, Agent, or Firm* — Louis J. Hoffman

(57) ABSTRACT

At least one portable RF communications device in conjunction with at least two fixed-location service-area antenna stations respectively capable of RF communication with the at least one device performs the steps of: (I) using a portable device at a selected location to measure RF communications signals from the plurality of local fixed-location service-area antenna stations and electronically storing at least two of the respective reception signal strength measurements; and (II) monitoring a portable device location by causing the device to measure reception signal strength associated with local fixed-location service-area antenna stations signals, and to electronically compare these measurements with the stored at least two measurements.

31 Claims, 1 Drawing Sheet

U.S. PATENT DOCUMENTS

| | | | |
|---|---|---|---|
| 7,551,929 B2 | 6/2009 | Alizadeh-Shabdiz | |
| 7,640,288 B2 | 12/2009 | Yao | |
| 7,768,963 B2 | 8/2010 | Alizadeh-Shabdiz | |
| 7,769,396 B2 | 8/2010 | Alizadeh-Shabdiz | |
| 7,818,017 B2 | 10/2010 | Alizadeh-Shabdiz | |
| 7,835,754 B2 | 11/2010 | Alizadeh-Shabdiz | |
| 2003/0148771 A1* | 8/2003 | de Verteuil | 455/456 |
| 2004/0203863 A1* | 10/2004 | Huomo | 455/456.1 |
| 2005/0159174 A1* | 7/2005 | Bar-On et al. | 455/456.6 |
| 2007/0232322 A1 | 10/2007 | Jagadeesan | |
| 2008/0039114 A1* | 2/2008 | Phatak et al. | 455/456.1 |
| 2009/0031006 A1 | 1/2009 | Johnson | |
| 2010/0156706 A1* | 6/2010 | Farmer et al. | 342/357.1 |

OTHER PUBLICATIONS

Y. Zhao, "Mobile Phone Location Determination and its Impact on Intelligent Transportation Systems," IEEE Transactions on Intelligent Transportation Systems, vol. 1, No. 1, pp. 55-64, Mar. 2000.

A Survey and Taxonomy of Location Systems for Ubiquitous Computing—by Jeffrey Hightower and Gaetano Borriello (Technical Report UW-CSE Jan. 8, 2003).

SpotON: An Indoor 3D Location Sensing Technology Based on RF Signal Strength—by Jeffrey Hightower and Gaetano Borriello—(UW CSE Technical Report #Feb. 2, 2002).

* cited by examiner

100 → 110

200   210

220

300 → 310 → 320 → 330

400

500 → 510 → 520 → 530

600 ←→ 610 ←→ 620 ←→ 630

700 → 710 → 720

SIGNAL COMPARISON-BASED LOCATION DETERMINING METHOD

CROSS-REFERENCE TO RELATED APPLICATIONS

This application is a continuation of application Ser. No. 11/533,238, filed on Sep. 19, 2006 now U.S. Pat. No. 7,706,811 and entitled "Signal Comparison-Based Location Determining Method". The disclosures of said application and its entire file wrapper (included all prior art references cited therewith) are hereby specifically incorporated herein by reference in their entirety as if set forth fully herein. Furthermore, a portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention generally relates to methods for determining the location of a mobile telephone, or of a mobile communications device. More specifically, the present invention relates to a method for determining the location of a mobile telephone, wherein the mobile telephone is preferably capable of performing measurements of signal characteristics deriving from signals being received from mobile telephone service area antennas, of performing calculations related thereto, and of storing these measurements and/or calculation results.

BACKGROUND ART

Simply stated, there is a longstanding problem of providing high accuracy location data for mobile devices, such as mobile telephones. In the most critical aspect, the problem is to maintain user privacy of precise location data of the mobile telephone user. Nevertheless, there also remains a need in the art for simple straightforward improvements in determining the precise location of mobile devices; especially in poor signal-reception locations such as in dense multi-story urban centers. Furthermore, there is a need in the art for providing an elevation component to location data, so as to locate a device in a multi-story structure.

Motorola, Inc., Overview of 2G LCS Technologies and Standards (3GPP TSG SA2 LCS Workshop LCS-010019—London, UK, 11-12 Jan. 2001)—discusses why locating mobile phones becomes a hot topic in telecommunications industry, and what technologies are being studied and standardized.

Y. Zhao, "Mobile Phone Location Determination and Its Impact on Intelligent Transportation Systems," IEEE Transactions on Intelligent Transportation Systems, vol. 1, no. 1, pp. 55-64, March 2000. —provides more information on different location technologies and related location services.

There are many location-determining methods used to determine the location of a cell phone. These methods differ in the level of accuracy they provide as well as their implementation. In general these methods could be divided into methods that involve the cellular network participation and those that don't (handset based only).

Methods that involve the cellular network participation include:
Cell-ID
TDOA—Time Difference Of Arrival
TOA—Time Of Arrival
AOA—Angel Of Arrival
EOTD—Enhanced Observed Time Difference
A-FLT—Advanced Forward Link Trilateration
A-GPS—Assisted GPS (Global Positioning System)

Methods that rely solely on the handset to determine its position:
GPS—Global Positioning System Expect Cell-ID where the location of the handset is simply determined to be within the area of the cell, where the cell's base station location is known and the accuracy depends on the size of the cell (accuracy of anywhere between 100 meter and 3,000 meters) all other methods require different levels of calculations either by the network or the handset or both.

A substantially similar field where virtually the same class of location based need arise is in the area of ubiquitous computing. Essentially, with respect to location based applications, the primary difference between the mobile telephony and ubiquitous computing relates to privacy—since the mobile telephone user might prefer not to allow his location to be monitored, while privacy is a non-issue for a ubiquitous computer attached to a box in a large warehouse or to a piece of luggage in an airport customs clearance center or to a semi-assembled component in a multifaceted manufacturing facility or to a semiautonomous vehicle in a recreation center, etc.

A Survey and Taxonomy of Location Systems for Ubiquitous Computing—by Jeffrey Hightower and Gaetano Borriello (Technical Report UW-CSE 01-08-03)—"Emerging mobile computing applications often need to know where things are physically located. To meet this need, many different location systems and technologies have been developed. In this paper we present the basic techniques used for location-sensing, describe a taxonomy of location systems, present a survey of research and commercial location systems that define the field, show how the taxonomy can be used to evaluate location-sensing systems, and offer suggestions for future research. It is our hope that this paper is a useful reference for researchers and location-aware application builders alike for understanding and evaluating the many options in this domain."

SpotON: An Indoor 3D Location Sensing Technology Based on RF Signal Strength—by Jeffrey Hightower and Gaetano Borriello—(UW CSE Technical Report #2000-02-02) "Providing a reliable technology and architecture for determining the location of real world objects and people will undoubtedly enable applications, customization, and inference not currently possible. This paper documents the creation of SpotON, a new tagging technology for three dimensional location sensing based on radio signal strength analysis. Although there are many aspects to the topic of location sensing and several of them will be briefly discussed, this paper is primarily concerned with the hardware and embedded system development of such a system."

For many mobile telephone location based services, constant calculation of a user's handset location is required. For example, if a user asked to receive food coupons whenever he enters a specific area or to be informed if a child carrying a cell phone left a certain perimeter around the house, or if the user asked for a group call to his cell phone and home phone every time that he is at home; in order to give him the option to answer calls to his cell phone on his landline.

From a network perspective, in an anticipated emerging world where Location Based Services (LBS) are expected to be widely used and of those services many require constant monitoring of a user's cell phone location, those methods will require the networks to have a lot of infrastructure dedicated to the determination of handsets' locations.

From a privacy perspective, having the cellular network constantly monitor a user's location is problematic to many people. For example, the user asked to receive coupons for merchandise on sale when he is in the shopping area next to his home. However, that same user is troubled by a prospect that, in order for the coupons to be sent, the user's location must be constantly monitored so as to find out when he enters the shopping area.

Obviously the privacy problem could be solved by having the cell phone itself monitor its position, and activate an application when the cell phone concludes that the user has entered the shopping area, etc. This class of solution is also amenable for adaptation to ubiquitous computing situations—since it simply makes the location monitoring logic part of a distributed computing architecture.

Having the cell phone monitor its position will also significantly reduce the infrastructure required by the cellular network to determine the location of handsets. This is also true in ubiquitous computing applications.

Currently a cell phone can determine its geographical location by using a GPS receiver. The challenges with using a GPS in a handset—is that GPS require significant calculations that takes time, up to several minutes; it is difficult to get GPS signals in dense urban areas; and GPS does not distinguish between different elevations at the same location. Thus, in our shopping area example, GPS would not distinguish between entering a large department store from entering a shopping center plaza in a floor below or entering a professional service office in a floor above.

A-GPS (Assisted-GPS), which is intended to reduce the time it takes to determine a location as well as possibly calculate the location in the network in order to reduce the complexity required from the cell phone, once again requires the network.

Using Cell-ID by the cell phone is limited as a cell area location resolution is not good enough for most location based applications. On the ubiquitous computing side, division of large areas into micro-cells presents a substantially similar location accuracy threshold.

There are, of course, numerous patents that have contributed to progress in this art—especially in the field of cellular telephones—most especially since there is an ongoing attempt to reach compliance with regulations calling for instant automatic location reporting for cellular telephone users requesting emergency services (police, ambulance, fire department, etc.).

U.S. Pat. No. 7,057,556—Method And Apparatus For Geolocating A Wireless Communications Device—"The time difference of arrival for a signal received at two or more receiving sites as transmitted from a wireless communications device, is determined by a frequency domain technique. The constituent frequencies of the signals received at the two or more receiving sites are determined, including the phase, or a value representative of the phase, of each frequency component. The phase values for the same frequency are subtracted to yield a phase difference values as a function of frequency. The slope of the function represents the time difference of arrival for the wireless communications device signal as received at the two receiving sites. To determine the mobile location based on the determined time difference of arrival values, a seed or initial location is first assumed for the wireless communications device and the distance difference of arrival (the time difference of arrival multiplied by the speed of light) is calculated. The calculated time difference of arrival is then used to adjust the distance difference of arrival by continuously iterating the position of the wireless communications device until the calculated distance of arrival and the calculated time difference of arrival (as multiplied by the speed of light) are within a predetermined margin."

U.S. Pat. No. 7,050,786—Method And Apparatus For Locating A Wireless Device—"Disclosed is a method and apparatus for locating a wireless device especially useful for locating a cellular telephone making a call from an unknown location. The call may be a request for emergency assistance, or for location-based commercial services, for example. Various embodiments may optionally include a mobile location component, a cellular telephone enabled to chirp-on-demand, and/or an interferometer link. A mobile location component may include a directional antenna. The directional antenna may be mounted on an antenna boom on top of an emergency vehicle, for example. The mobile location component may alternately or additionally comprise a hand-held unit. System elements may cooperate to generate a situation awareness map or other display. The mobile location component may be moved in the general direction of a first location calculation associated with a first circular error of probability. After being moved in the general direction, the mobile location component may cooperate with other elements to determine a second location calculation associated with a second circular error of probability. Second and subsequent location calculations are of increasing precision, enabling an emergency vehicle or attendant to zero in on a cellular telephone."

U.S. Pat. No. 6,972,717—Method And Apparatus For Enhanced 911 Location Using Power Control In A Wireless System—"A method of locating a mobile telephone includes steps of receiving, transmitting, increasing and determining. In the receiving step, a first base station receives a call from a mobile telephone, the call including a dialed number and a TDMA signal. In the transmitting step, the base station transmits a control message to the mobile telephone when the dialed number meets a predetermined criterion, such as being 911. The control message instructs the mobile telephone to transmit the TDMA signal at a maximum power. In the increasing step, the mobile telephone increases the TDMA signal to maximum power in response to the control message. Then in the determining step, location information for the mobile telephone is determined based on at least one characteristic of the TDMA signal received at-least one of the first base station and other base stations. In an alternate embodiment, the method is practiced in a mobile telephone and the power level is automatically increased in response to the dialed number meeting a predetermined criterion."

U.S. Pat. No. 6,674,403—Position Detection And Location Tracking In A Wireless Network—"A system and method for performing real-time position detection and motion tracking of mobile communications devices moving about in a defined space comprised of a plurality of locales is provided. A plurality of access points are disposed about the space to provide an interface between mobile devices and a network having functionality and data available or accessible there-from. Knowledge of adjacency of locales may be used to better determine the location of the mobile device as it transitions between locales and feedback may be provided to monitor the status and configuration of the access points."

EP 1241909—Method And Computer Readable Medium For A Program For Location Determination Of A Mobile Terminal—"A method for location determination of a mobile terminal by means of radio connections which are controlled by a common server, characterized by providing a least one pair of different radio zones closely spaced from each other so that distinct directional information transversely to a boundary between the pair of radio zones is provided upon recording of the movement of the mobile terminal in the zones. Furthermore, preferably characterized in that a pair of radio zones comprises a first zone and a second zone, and that information is stored in the server defining that the mobile unit is present on one side of said boundary if the mobile unit is first recorded in the second zone and then in the first zone, and defining that the mobile unit is present on the other side of said boundary if the mobile unit is first recorded in the first zone and then in the second zone."

The challenges, therefore, are to develop a location-determining method that would: (A) Take place on the cell phone for the benefit of privacy (monitoring of user location by the cell phone and not by the cellular network) as well as in order to reduce the infrastructure required by the cellular network to determine cell phone locations; (B) Will not require heavy calculations by the cell phone in order to be able to determine a location fast and with minimal resources so the method be suitable for cheap handsets and not only expensive handsets with capabilities to perform heavy calculations; and (C) Provide accurate enough location determination.

Simply stated, there is a need for performing geographical location determinations with ordinary RF communications hardware (without GPS capability) because that is less expensive than performing the same determination with GPS hardware components. Furthermore, there is another independent need to perform location determinations within a scope of privacy to the user—in order for him to permit application events that depend on location. There is also a need for location determination in locations where GPS reception is problematic. In addition, there is a need for determining elevation components of location without the addition of additional hardware—especially for devices that are already GPS capable. Likewise, for both cellular telephony and the ubiquitous computing arts there is a need to provide elevation location data and/or to reduce infrastructure intensive application for location determination, progress in at least one of these areas would constitute a meaningful contribution to alleviating a longstanding need in the art; and would set the stage for the progress of further location-knowledge-dependent applications.

DISCLOSURE OF INVENTION

The aforesaid longstanding needs are significantly addressed by embodiments of the present invention, which specifically relates to a Signal-Comparison Based Location-Determining Method. The instant method is especially useful in telecommunications and/or ubiquitous computing applications wherein there exists a need to provide improved privacy, and/or to provide elevation location data, and/or to reduce infrastructure intensive application for location determination.

The instant invention relates to embodiments of a Signal-Comparison Based Location-Determining Method, operable by at least one portable RF communications device in conjunction with at least two fixed-location service-area antenna stations respectively capable of RF communication with the at least one device wherein the stations are substantially continuously operating, and the method is comprising the steps of:
(A) Registering a selected location by first-causing a portable RF communications device at the selected location (i) to receive an RF communications signal from a plurality of local fixed-location service-area antenna stations, and (ii) to measure reception signal strength respectively associated with the received signal from at least two of the plurality of antenna stations;
(B) Recording the selected location by electronically storing at least two of the respective reception signal strength measurements;
(C) Monitoring by second-causing a portable RF communications device (i) to receive communications signals from a plurality of respectively local fixed-location service-area antenna stations, and (ii) to measure reception signal strength associated with the signals; and
(D) Determining if the portable RF communications device of the Monitoring step is at the selected location of the registering step by electronically comparing measurements in the monitoring step with the stored at least two measurements of the Recording step.

According to a simpler categorization, the instant invention relates to a methodological embodiment (see FIG. 1) whereby at least one portable RF communications device in conjunction with at least two fixed-location service-area antenna stations respectively capable of RF communication with the at least one device perform the steps of: -100-(I) using a portable device at a selected location to measure RF communications signals from the plurality of local fixed-location service-area antenna stations and electronically storing at least two of the respective reception signal strength measurements; and -110-(II) Monitoring a portable device location by causing the device to measure reception signal strength associated with local fixed-location service-area antenna stations signals, and to electronically compare these measurements with the stored at least two measurements.

Please note, the present invention is herein described with a certain degree of particularity, however those versed in the art will readily appreciate that various modifications and alterations may be carried out without departing from either the spirit or scope, as hereinafter claimed. For example, the majority of the description relates to direct measurements of signal strengths and direct comparisons of those measurements. Such direct measurements are generally correct in a cellular telephone GSM environment, however in a cellular telephone CDMA environment it is the relative signal strengths that form an important metric for comparative purposes. Similarly, for other antenna space environments, measurements and comparisons thereof should conform to the underlying policy that governs the management of antenna space signal strength management—or of equivalent antenna space transmission metric characteristics. For example, a strongest signal may be used as a unit to help normalize other simultaneous measurements; however, since that strongest signal may encounter inoperative events or radical environmental changes (e.g. construction of a signal blocking structure between the "strong" antenna and the reception location), one would prefer to retain a capability to renormalize measurements within the context of the instant method.

Simply stated, a conceptually instant enabling embodiment of the present invention is a cellular telephone device that looks at the signal strengths (and preferably corresponding local base station service area antenna IDs) to characterize an antenna space signal-reception signature as being substantially equivalent to a current location. The device needs a means for remembering this signal strength (preferably with the antennas' IDs), and this means may be on the device per se, kept at a remote storage (or even transferred from the current device to the owner's next cell phone). The device can "know" that it has returned to the original location where the signal strengths were measured (and the antennas' IDs preferably captured). Since the device is capable of receiving and measuring such signals, the device simply performs such reception measurements and compares these measurements with the remembered signal strength combinations. Whenever there is a substantial equivalence between the remembered signal strengths (and IDs) and the currently being monitored signal strengths (and IDs), then the device can conclude that it is probably at the original location where the original measurements were performed.

Now, illustrative enabling embodiments of a Signal-Comparison Based Location-Determining Method of the instant invention—according to a simplified aspect—substantially relate to a method for determining a cell phone (or a ubiquitous computer) location comprising: (A) at a desired location—Causing a cell phone (or a ubiquitous computer) to measure signal strengths from surrounding cells and to record the signal strengths measured by the cell phone (or the ubiquitous computer) from the surrounding cells; (B) at a current location—Causing a cell phone (or a ubiquitous computer) to measure the signal strengths from surrounding cells; and (C) Causing the Cell phone (or ubiquitous computer) to compare the measured signal strengths from surrounding cells at the current location with the recorded signal strengths from surrounding cells at the desired location in order to determine whether the cell phone or the ubiquitous computer of the present location is also at the desired location.

Today, given our technological orientations, one's normal concept of location combines some small number of quantitative coordinates according to some consistent coordinate system. Typically location is described by a Cartesian intersection of latitude and longitude; and sometimes including elevation too. Elsewhere, location is described by triangulation from two known positions. Nevertheless, when desiring to express the location of a mobile telephone (i.e. cellular telephone, "tell phone", pager, area wide wireless telecommunications apparatus, blackberry, ubiquitous computer, or the likes), the ability to capture precise longitude, latitude, or angular measurements become calculation intensive—well beyond the economic value of their engineering precision; most particularly if these calculations must be performed on the mobile telephone.

Now, the instant invention takes note of an additional ergonomic parameter, typical of mobile telephones, which greatly simplifies these calculations; perhaps even increasing the accuracy of the resultant location specification. Let's start with a simplest example; a mobile telephone is in the possession of a resident of a small house, which is in a sparsely populated rural environment. By the very nature of this situation, that small house probably only falls within the antenna coverage of a single cellular telephone service providing antenna. Accordingly, if the cell-phone captures a distance equivalent measurement between itself (when located in that small house) and the area service antenna, then one would expect that this measurement simply describes a constant radius distance around the service antenna. Accordingly, from a strict scientific perspective, whenever the cell-phone measures that it is at that radius distance from the service antenna, it can only logically presume that the probability of it also being in that small house is substantially proportional to the fragment of arc that the house represents with respect to the circumference specified by that radius.

OK, now if the owner of the cell-phone is a tractor driver who typically continuously drives back and forth across the length and breadth of the service antenna coverage area, then the presumed probability that the cell-phone radius measurement corresponds to him being in that house is as described. However, if he is in that house an average of eight hours per day, then there is already a high probability that the radius measurement from the cell-phone indicates that he is in the house. More likely, the cell-phone owner is not an indentured round-the-clock tractor driver, but an ordinary vehicle commuter who goes from that house to various other locations, using established paved roads. This being the case, there are perhaps four to six locations where these roads coincide with that radius measurement, and it is only of minimal probability that a part of one of those roads follows that circumference for any span or that the cell-phone owner parks his vehicle at such a location. Accordingly, there is an already very high probability that the radius measurement from the cell-phone indicates that he is in the house.

One can easily provide a significant increase in this already very high probability by delaying confirmation of the measurement calculation—at least until it is performed at least twice. Specifically, to eliminate spurious observation of the cell-phone owner traversing at that circumference, one need only wait to see that the same measurement had been made twice with perhaps a 2-3 minute interval wait there-between. That interval would be enough to edit out occurrence of the cell-phone owner stopping or driving over (or along) the circumference; or stopping at some incidentally located traffic light, etc.

Moving on to a slightly more realistic scenario, the house is located in a rural environment (see FIG. 2) where there are occasional clusters of buildings and three service antennas -200- -210- -220- such that there is a 40% probability of a building being in the coverage area of a single service antenna, a 40% probability of a building being in the overlapping coverage area of two service antennas, and a 20% probability of a building being in the overlapping coverage area of three service antennas. In this instance, the cell-phone captures respective distance equivalent measurement(s) between itself (when located in that small house) and each of area service antenna(s). In order to make this example more simplistic, one can say that the cell-phone ignores any distance equivalent measurement (e.g. service antenna signal strength as measured at the mobile device, arrival times or phases of signals arriving from surrounding cells, or the likes) below a predetermined threshold. Now in this example, there is yet a substantially higher probability that a confluence of the captured radius measurement(s) from the cell-phone indicate that he is in the house.

However, instead of the simplistic assumption, that we only consider distance equivalent measures for service antenna signals that are capable of providing a reasonable quality of service to the mobile telephone unit, we substitute a more realistic assumption—specifically that we consider distance equivalent measures from service antenna signals that are discretely recognizable (i.e. where the service antenna ID is non-ambiguously recognizable with the signal that the mobile telephone receives from the respective antenna). Now, for almost every rural, suburban, and urban location where there is mobile telephone service provided—the mobile telephone will be able to equate its current position with a unique coordinate signature comprising at least one (but preferably a plurality of) identifiable service antennas and their respective distance equivalent measurement therefrom, as appreciated from their respective signal strengths (or like metrics).

Simply stated, if a mobile telephone (at a user selected location) measures a plurality of service antenna signals and stores these with their respective service antenna identifications, then that mobile telephone (or an equivalent unit) upon observing an identical list of service antennas with substantially identical respective signal strengths—can reasonably conclude that it is within a predetermined proximity of the original user selected location. We will call the coordinate of the user selected location a "fingerprint"—because we believe that each such location has (associated with it) a substantially unique combination of service antenna identifications with respective distance equivalent measurements (e.g. service antenna signal strength as measured at the mobile device, arrival times or phases of signals arriving from surrounding cells as measured by the mobile device, or the likes).

For practical purposes, the fingerprint should carry substantially about the same probability of ambiguity between all combinations of two region-similar physical locations (having the "same" fingerprint) as the Global Positioning System (GPS). Recall that GPS has a nominal probability of giving biased reading (false reading)—especially in the locations near where GPS will give no reading whatsoever—such as inside building or in dense urban areas or in steep mountain gorges, etc. Specifically, GPS will fail to give a proper coordinate reading whenever it can not simultaneously locate three positioning satellites. However, under a different (but similarly improbable combination of circumstances), the fingerprint concept of the instant invention may fail to provide adequate location recognition (ambiguity). Our first order suspicion is that the fingerprint concept will be at least as good (over a large collection of urban, suburban, and semi-rural settings) as the GPS system—albeit the fingerprint location concept does not require the special hardware of GPS Systems (antenna & computation hardware). Accordingly, for an equal quality of service, it is reasonable to suggest that the fingerprint concept embodiments will always be less costly than equivalent GPS embodiments.

These respective distance equivalent measurements are generally not adequate for direct triangulation calculation from the known positions of the service antennas—because in mountainous regions and more particularly in urban landscapes, the signal strength is a function of the convolutions of the signal path length and of the absorption or reflection of materials encountered there-between. Nevertheless, since service providers generally measure ground truth to locate shadow spots and the likes, the accumulation of GPS coordinates in association with location fingerprints—will eventually create adequate computational closure for the provision of transformations between fingerprints and standard geographical map coordinates—via an intermediate fingerprint "terrain" map database.

Intentionally, cell phones including both a GPS and the instant invention method could help build such a database. The GPS would be used to identify a desired location for the first time and the signal strength fingerprint will be used to recognize the desired location from that point in time and onwards). In a practical application, this means that a mobile telephone calling an emergency number (police, fire, ambulance, etc.) and transmitting the fingerprint that it currently records—should thereby provide the emergency response with adequate information to transform the fingerprint into a real world location and to arrive at same. Thus, until there is substantially complete closure in the construction of "fingerprint" topological database maps, a fingerprint supplemented GPS reporting to emergency services would provide a best opportunity embodiment for those services to locate the caller.

Furthermore, because service antennas are generally not located at identical elevations (nor coplanar); and the elevation of service antennas is known, Thus, measuring at two locations, having identical latitude and longitude but differing in elevation, will not yield identical fingerprints. This is a significant advancement over GPS, which is generally elevation insensitive for location determination (i.e. differentiating between floors of a multi-story building, shopping center, or the likes).

Now, according to more heuristic variant embodiments of the instant invention, the mobile telephone will generally measure and record a greater than necessary plurality of service antenna identifiers with their respective distance equivalent metrics. Thereafter, when the mobile telephone monitors its respective present location in service area antenna signal strength space (or the likes), then finding a correlation with a majority of such measurements in a single record will lead the device to logically conclude that there is a high probability that this is the location of that measurement—albeit that there is perhaps a new building between the current location and one or more of the proximate service area antennas. Accordingly, the device may build up an evolving description to characterize a known location. Similarly, the device may normalize the measurements in each record or develop pair wise combinations of relationships between measurements of a single record—thereby opening the variation embodiment wherein a different mobile telephone may use this same data; which in turn allows the user of this mobile telephone to transfer his collection of records to another device that may not identically measure service antenna characteristics.

BRIEF DESCRIPTION OF THE DRAWINGS

In order to understand the invention and to see how it may be carried out in practice, embodiments including the preferred embodiment will now be described, by way of non-limiting example only, with reference to the accompanying drawings. Furthermore, a more complete understanding of the present invention and the advantages thereof may be acquired by referring to the following description in consideration of the accompanying drawings, in which like reference numbers indicate like features, and in which an embodiment "name" is only for purposes of helping a reader to differentiate between embodiments and among various groups of aspects and/or variations therein, and wherein.

MODES FOR CARRYING OUT THE INVENTION

Figures 1, 2, 3, 4, 5, 6, 7:
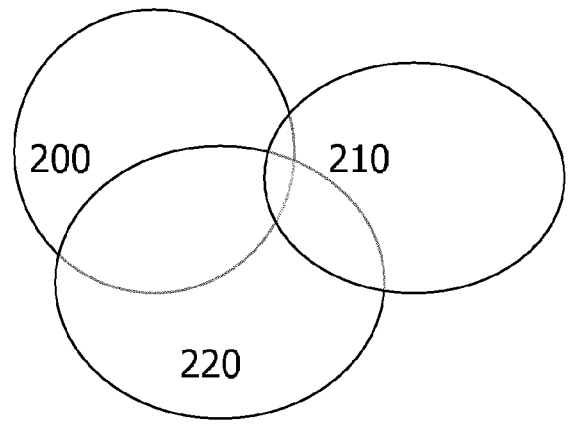
FIG. 1 illustrates a schematic view of a "methodological" embodiment.
FIG. 2 illustrates a schematic view of an antenna space reception map
FIG. 3 illustrates a schematic view of a "basic" embodiment.
FIG. 4 illustrates a schematic view of a "first appurtenance" embodiment
FIG. 5 illustrates a schematic view of a "second appurtenance" embodiment.
FIG. 6 illustrates a schematic view of a "system" embodiment.
FIG. 7 illustrates a schematic view of an "illustrative enabling" embodiment

Embodiments and aspects of the instant invention may be embodied in various forms, wherein a Basic embodiment (see FIG. 3) of the instant invention relates to A Signal-Comparison Based Location-Determining Method, operable by at least one portable RF communications device in conjunction with at least two fixed-location service-area antenna stations respectively capable of RF communication with the at least one device wherein the stations are substantially continuously operating, and the method is comprising the steps of: (A) Registering -300- a selected location by first-causing a portable RF communications device at the selected location (i) to receive an RF communications signal from a plurality of local fixed-location service-area antenna stations, and (ii) to measure reception signal strength respectively associated with the received signal from at least two of the plurality of antenna stations; (B) Recording -310- the selected location by electronically storing at least two of the respective reception signal strength measurements; (C) Monitoring -320- by second-causing a portable RF communications device (i) to receive communications signals from a plurality of respectively local fixed-location service-area antenna stations, and (ii) to measure reception signal strength associated with the signals,; and (D) Determining -330- if the portable RF communications device of the Monitoring step is at the selected location of the registering step by electronically comparing measurements in the monitoring step with the stored at least two measurements of the Recording step.

Now in greater detail, the Basic instant embodiment is operable by at least one portable RF communications device in conjunction with at least two fixed-location service-area antenna stations respectively capable of RF communication with the at least one device wherein the stations are substantially continuously operating. As is likewise mentioned elsewhere herein, the RF device may be a cellular telephone or a communications enabled ubiquitous computer or any mobile device capable (I) of receiving RF signals and (II) of measuring their respective signal strengths (or of measuring any parameter that is equivalent to signal strength), and of communication (internal or external) with a module that can store data and can logically and mathematically compare values and therewith arrive at a comparative conclusion between two sets of data. Essentially these sets of data are those created in the storing step and in the monitoring step. Depending on the sophistication of software enabling the comparative conclusion, the operations involved may be simply logical comparisons, arithmetically threshold (rounded) logical comparisons, arithmetic, probabilistic, fuzzy logic, neural network enabled, heuristic, or the likes.

Furthermore, in greater detail, we now turn our attention to the Basic instant embodiment step of: (A) Registering a selected location by first-causing a portable RF communications device at the selected location (i) to receive an RF communications signal from a plurality of local fixed-location service-area antenna stations, and (ii) to measure reception signal strength respectively associated with the received signal from at least two of the plurality of antenna stations. This is a data collection step where the portable device comes to measure the antenna signal space reception characteristics at the selected location. Depending on the sophistication of the specification enablement, one should give priority of "attention" to the strongest signals—since these are probably the most robust for characterizing the antenna space reception signature of this selected location. A highly sophisticated enablement will collect lots of measurement data and then be able to come to viable conclusions using which ever verifiable fraction of that data is reproducible at a subsequent instantiation. A more simplistic approach would be to just take the up to five strongest signals.

Likewise, in greater detail, we now turn our attention to the Basic instant embodiment step of: (B) Recording the selected location by electronically storing at least two of the respective reception signal strength measurements. Storage may be on the device per se or transferred to a remote storage facility. Privacy for a cellular telephone user preferred that the data be stored on the cellular telephone unit, however for other types of device or where privacy is not important (e.g. monitoring luggage or logistics of components in a warehouse or police in the field or the likes) the data may be off loaded. The offloading may be done in real time or may be done in batch at convenient intervals or to testify to the location of the device at a time in question or the likes.

In addition, in greater detail, we now turn our attention to the Basic instant embodiment step of: (C) Monitoring by second-causing a portable RF communications device (i) to receive communications signals from a plurality of respectively local fixed-location service-area antenna stations, and (ii) to measure reception signal strength associated with the signals. Essentially, this step is by first approximation alike in technical detail to the Registering step. However, the monitoring step may be of a different degree of detail to the registering step. For example, the registering step may collect lots of data while the monitoring step collects sparse first order data, and then collects more comprehensive data for the next step (Determining). Essentially, one does not want to dedicate lots of portable device resources to the monitoring activity, so one may divide the monitoring into low accuracy monitoring activities—which just tell the device if there might be anything to seriously compare (such as the surrounding antennas' IDs at the selected location and current location are the same and therefore more resources should be allocated to the monitoring); and higher accuracy monitoring activity—which takes the necessary resources to make the necessary determining definitive.

Finally, in greater detail, we now turn our attention to the Basic instant embodiment step of: (D) Determining if the portable RF communications device of the Monitoring step is at the selected location of the registering step by electronically comparing measurements in the monitoring step with the stored at least two measurements of the Recording step. Where privacy is of concern then all of the four steps should be performed on a single mobile device. However, in a privacy irrelevant shared data environment, one might even reach the case where Registering is done on a first device, Monitoring is done on a second device, Storing is done in an offsite facility, and Determining is done in a different offsite facility.

According to a first implementation aspect of the Basic embodiment of the Signal-Comparison Based Location-Determining Method, the Registering step includes identifying at least one ID within at least one of the respectively received signals; and the Recording step includes storing each of the at least one IDs with the respective reception signal strength measurement. In the context of this first implementation aspect, it is according to a preferred manifestation that the Monitoring step includes identifying at least one ID within at least one of the respectively received signals and the Determining step includes electronically matching at least one ID of the Monitoring step with the stored at least one ID of the Recording step. Simply stated, while the method may be accomplished without having an ID on every signal, having such an ID would make the job of concluding, that the current location is the selected location, much easier. Nevertheless, since ID is not required, then have one or more signals with ID may also provide for logic simplification. In the case of cellular telephony, the ID seems to always be available in service areas. However, in areas plagued by intermittent service problems, sometimes a device will see a signal where the ID is not recognizable. In other applications, the device is not a cellular telephone but does use the cellular base station signals as "landmarks" for registering "location"—so the device might not have the ability to look for an ID even if the ID is clearly visible on the respective signals.

According to a second implementation aspect of the Basic embodiment of the Signal-Comparison Based Location-Determining Method, the Monitoring step includes iteratively performing the sub-steps C.i and C.ii with a predetermined time delay between successive iterations of C.i such that the monitoring step data is used only if a substantial portion of the successive C.ii measurements are alike within a predetermined threshold—since this indicates that the portable RF device of step C is temporally immobile. This returns to our case above, where a driver happens to stop at a traffic light that just resembles a known confluence of signal strengths. However, if the driver does not stay there more than a minute or two, we would conclude that he has not really arrived at the selected location.

According to a third implementation aspect of the Basic embodiment of the Signal-Comparison Based Location-Determining Method, the Determining step includes improving the electronically stored at least two of the respective reception signal strength measurements of step B by storing at least one measurement of step C therewith—thereby upgrading robustness of the electronically stored measurements. This case relates to creating an ability to improve the correctness of the basic method. For example, in the urban terrain, new building are being built and old ones are being modified while streets are being paved with alternate materials, large billboards are being erected, old antennas are replaced and new ones are added—all of which cause the preferred method to attempt to upgrade the data of the original registering step; and to learn new aspects of the current antenna space environment. Another realistic example is the addition of a cell site and its impact on pre-existing cells.

According to a fourth implementation aspect of the Basic embodiment of the Signal-Comparison Based Location-Determining Method, the Registering step includes accessing a GPS location coordinate for the selected location and Recording step includes keeping the GPS location coordinate with the stored signal strength measurements. This aspect anticipates that a transformational data bank could be created by collecting correspondences between GPS (latitude longitude) coordinates and antenna space reception "coordinates" for the same location. If sufficient correspondence data is collected, then a never registered location can be found by grabbing antenna space reception "coordinates" and extrapolating them within the correspondence set. This would be of great benefit for "911" emergency service location-determining compliance; since locations failing to be able to report GPS could be known from extrapolation using only the reception signature.

According to a fifth implementation aspect of the Basic embodiment of the Signal-Comparison Based Location-Determining Method, the Registering step includes directly transferring the measurements within the portable RF communications device to a storage module therein whereat the Recording step is preformed. By contradistinction, according to a sixth implementation aspect of the Basic embodiment of the Signal-Comparison Based Location-Determining Method, the Registering step includes, via RF communications, transferring the measurements from the portable RF communications device to a storage device whereat the Recording step is preformed; and wherein the Recording step includes, via RF communications, receiving the measurements. Please note that these fifth and sixth aspects are not necessarily mutually exclusive since onboard storage on the device improves response time while offsite storage complements creation of a database of such reception space signatures.

According to a seventh implementation aspect of the Basic embodiment of the Signal-Comparison Based Location-Determining Method the Registering step allows a user to append a designation tag to the registration data—for example—denoting the data to be stored as "Home" or "Office" or "222 East Street" or the likes.

According to an eighth implementation aspect of the Basic embodiment of the Signal-Comparison Based Location-Determining Method, the Determining step includes calculating a confidence metric according to a degree of correlation between the measurements in the Monitoring step with the stored at least two measurements of the recording step. This complements our discussion of evolving signal strength reception characteristics of the urban landscape; and also complements the detail of the preamble that any specific service area antenna may be taken out of service for repairs, upgrades, and the likes. Thus, it is preferred to introduce statistical comparisons, threshold values, heuristics, and the likes to improve a user's confidence in the accuracy of the determining step result.

Further embodiments and aspects of the instant invention may be embodied in various forms, wherein a first appurtenance embodiment (see FIG. 4) of the instant invention relates to A Signal-Comparison Based Location-Determining Database recorded on a tangible memory media -400- and having recorded thereon signal-strength location correlation data deriving from the Registering step or the Monitoring step of the Signal-Comparison Based Location-Determining Method, the Basic embodiment of the Signal-Comparison Based Location-Determining Method, and to any combination of its eight aforementioned aspects.

Now, additional embodiments and aspects of the instant invention may be embodied in various forms, wherein a second appurtenance embodiment (see FIG. 5) of the instant invention relates to An article of manufacture including a computer usable medium having computer readable program code embodied therein for Signal-Comparison Based Location-Determining, the computer readable program code in said article of manufacture including: (AA) first computer readable program code -500- for causing a computer to Register a selected location by first-causing a portable RF communications device at the selected location (i) to receive an RF communications signal from a plurality of local fixed-location service-area antenna stations, and (ii) to measure reception signal strength respectively associated with the received signal from at least two of the plurality of antenna stations; (BB) tied to the first computer readable software, second computer readable program code -510- for causing the computer to Record the selected location by electronically storing at least two of the respective reception signal strength measurements; (CC) tied to the second computer readable software, third computer readable program code -520- for causing the computer to Monitor by second-causing a portable RF communications device (i) to receive communications signals from a plurality of respectively local fixed-location service-area antenna stations, and (ii) to measure reception signal strength associated with the signals; and (DD) tied to the third computer readable software, fourth computer readable program code -530- for causing the computer Determine if the portable RF communications device of the Monitoring step is at the selected location of the registering step by electronically comparing measurements in the monitoring step with the stored at least two measurements of the Recording step; and Finally, please note that embodiments and aspects of the instant invention may be embodied in various forms, wherein a particularly generalized embodiment of the instant invention relates to A Signal-Comparison Based Location-Determining system (see FIG. 6), substantially as herein before described and illustrated, and characterized by using interconnected software enabled modules on at least one portable RF communications device, said modules operating in conjunction with at least two fixed-location service-area antenna stations that are respectively capable of RF communication with the at least one device wherein the stations are substantially continuously operating, and these software modules include: (A) a registration module -600- for Registering a selected location by first-causing a portable RF communications device at the selected location (i) to receive an RF communications signal from a plurality of local fixed-location service-area antenna stations, and (ii) to measure reception signal strength respectively associated with the received signal from at least two of the plurality of antenna stations; (B) a recording module -610- for Recording the selected location by electronically storing at least two of the respective reception signal strength measurements; (C) a monitoring module -620- for Monitoring by second-causing a portable RF communications device (i) to receive communications signals from a plurality of respectively local fixed-location service-area antenna stations, and (ii) to measure reception signal strength associated with the signals; and (D) a determination module -630- for Determining if the portable RF communications device of the Monitoring step is at the selected location of the registering step by electronically comparing measurements in the monitoring step with the stored at least two measurements of the Recording step.

For the sake of good order, it is noted that the reader is now directed to recall: the aforementioned illustrative enabling embodiment (see FIG. 7) of Signal-Comparison Based Location-Determining Method—according to a simplified aspect—substantially relate to a method for determining a cell phone (or a ubiquitous computer) location comprising: (A) at a desired location—Causing -700- a cell phone (or a ubiquitous computer) to measure signal strengths from surrounding cells and to record the signal strengths measured by the cell phone (or the ubiquitous computer) from the surrounding cells; (B) at a current location—Causing -710- a cell phone (or a ubiquitous computer) to measure the signal strengths from surrounding cells; and (C) Causing -720- the Cell phone (or ubiquitous computer) to compare the measured signal strengths from surrounding cells at the current location with the recorded signal strengths from surrounding cells at the desired location (in order to determine whether the cell phone or the ubiquitous computer of the present location is also at the desired location).

According to a first variation of the illustrative enabling embodiment, measuring signal strength includes identifying a unique ID in a portion of the signal.

According to a second variation of the illustrative enabling embodiment, the current location cell phone measuring the signal strengths from surrounding cells is done at regular time intervals or at scheduled times or a predetermined following an event or following a request.

According to a third variation of the illustrative enabling embodiment, the comparing step (C) includes comparing measured signal strengths on a cell by cell basis (for example, according to the unique ID of the first variation or according to other signal characteristics that facilitate differentiation). Preferably, two signal strengths measured by the cell phone from the same cell at the current location and the desired location are considered to be similar if their respective difference is within a predetermined threshold. Alternatively, signal strengths measured at a single location are compared to one-another so that spurious changes of RF absorbing or RF reflecting materials in the surrounding geographical region can be accounted for and intelligently ignored—as for example will be the case if an area of dirt roads re-paved with asphalt or one of asphalt re-paved over with brick-work, etc. Now, according to a further improvement, the compared signal strengths measured by the cell phone at the current location and at the desired location are considered similar when at-least a pre-determined number of these measurements (and preferably but not necessarily with their respective IDs) are matched—thereby resulting in a determinative judgment that the cell phone has returned to the desired location. It should be noted that there is a very low probability that a cell phone (measuring a few different signal strengths at the desired location) will at some future moment be in a different location having that same combination of signal strengths. Thus, the method of the instant invention may be accomplished without resorting to ID identification or comparison—however, presumably a larger number of no-ID signals would be probabilistically necessary to be measured and conclusively matched from the desired and current locations. According to a more preferred form of this variation embodiment, the at-least predetermined number of "these measurements" of cells are those cells with have the strongest measured signals. By way of a supplementary metric, the sum of the differences between measured signal strengths from the same cells at the current location and at the desired location, being less than a pre-determined threshold, will result in a determination that the cell phone has returned to the desired location.

According to a fourth variation of the illustrative enabling embodiment, measuring signal strength includes measuring an equivalent signal aspect characteristic such as the cell phone measuring arrival times or phases of signals arriving from surrounding cells or the likes.

According to a fifth variation of the illustrative enabling embodiment, the comparing step (C) includes the calculating of relations between signals of cells; especially but not necessarily wherein the cells are neighboring cells. Preferably, this is wherein cells are considered neighboring cells if their signals are the strongest signals measured by the cell phone. Substantially this means the most proximate base stations antennas are substantially respectively neighbors to one-another.

Thus, the combination of measured signal strengths from surrounding cells (including possibly more distant than just "surrounding" cells' service area antennas) as measured by the cell phone at a certain location creates a unique fingerprint identifying the location.

This unique fingerprint, which unlike GPS signals is always available to the cell phone, can be used to determine that a cell phone has returned to a location it has already been to.

Now we will turn our attention to discuss other useful aspects of the embodiments of the instant invention. Since the instant invention is used to determine that a cell phone current location is the same as a location that the cell phone has already been to in the past, there is no need to translate the combination of measured signal strengths at surrounding cells to geographical coordinates. Simply stated, for the simply purposes of the cell phone, substantially matching a current antenna space reception fingerprint (or a significant portion thereof) with a predetermined antenna space reception fingerprint (or a significant portion thereof) constitutes a return to an indeterminate coordinate space "brigin"—and this "Substantial matching" is sufficient to accomplish the most basic objectives of the instant invention.

The combination of signal strengths measured by the cell phone from surrounding cells at a specific location provides an accurate definition of the location with many advantages over existing location determination methods: [0092]1) No need to calculate geographical coordinates, which significantly reduces the amount of required calculation. [0093]2) Signal strengths can always be measured by a cell phone without the assistance of a cellular network. [0094]3) The simple calculation required to compare the signal strengths measured by a cell phone from surrounding cells at a current location and a desired location makes this method ideal for any cell phone in general and cheap cell phones that do not have a GPS and do not have the capability for significant calculation specifically.

The apparent disadvantage of the instant invention method is that it requires the cell phone to record the signal strengths at a desired location. Thus according to simplest embodiments of the instant invention, the user can not ask for a location based service by simply entering an address or a geographical coordinates. Having said that, many location based services are initiated when a user is at the location where he would like to receive the service, and therefore the suggested method's disadvantage does not limit the user for these services.

Moreover, the simple embodiment instant invention method can be used in conjunction with other location-determining methods. If geographical coordinates are initially used for the definition of a location based service, as soon as the cell phone is determined to be present at those geographical coordinates regardless of whether the cell phone determined its geographic location (using a GPS or another method) or the cellular network determines the geographic location of the cell phone or a combination, the cell phone can record the signal strengths at that geographical location and going forward instead of determining the cell phone has returned to that location by checking the geographical coordinates use the suggested invention as it requires less resources and is faster.

Accuracy-wise, the more cells a cell phone can measure the signal it receives from them, the more accurate the instant method is. Nevertheless, as described in the probabilistic considerations of the "small house" example (above), a large plurality of reception from different base station antennas is not necessarily required to provide "adequate" location identity confirmation (returning to a predetermined measured location). When it is described according embodiments of the instant invention that a cell phone measures a signal-strength from a surrounding cell, it means that the cell phone measures the strength of the signal sent by that cell's base station antenna. These measurements are from the perspective of the location of the reception device (the cellular telephone, ubiquitous computer, etc.) and substantially form a instance of an antenna space reception fingerprint; even though a significant portion thereof is sufficient for many applications. Clearly, as a cell phone user moves around he gets closer to some cells and get further away from other cells, which is reflected in the combination of signal strengths measured by the cell phone from the surrounding cells (generally speaking, the closer a cell phone is to a cell's base station the stronger the signal it will measure from the cell's base station). Exceptions, to the basic physics approximation of signal strength as proportional to a square of the distance separating the cell phone from the base station antenna, are created by the reflectivity and absorbance characteristics of materials in and along the signal path(s) there-between.

Unlike other location-determining methods, as it is the cell phone that measures the signal strengths, obstacles that impact the accuracy and availability of other location-determining methods do not impact the suggested method. Such obstacles include the non-availability of GPS signals within buildings or accuracy problems originating from the propagation of signals to cell towers and their measurement by systems located at the cell towers.

Here follows another non-limiting implementation—

The user reaches a location where he would like a certain location based service to take place every time he reaches that location.

Such a service could be having calls to his cell phone ring simultaneously both on his cell phone and the landline at the desired location every time he is determined to be at the desired location (the user's home for example) by the software responsible of determining its location which is running on the cell phone (a geo-location based group calling service).

An example of another service will be to receive discount coupons from mall stores every time the user enters the shopping mall next to his home (the shopping mall is a desired location).

The user will stand in the location where he would like something to take place every time he reaches that place (a desired location). Using his cell phone he will choose the action that he wants to take place. The action he would like to take place will then be associated with the location where the user is standing where the location will be defined by software running on the cell phone as the combination of signal strengths measured by the cell phone from surrounding cells.

It should be noted that the surrounding cells would each be uniquely identified by the cell phone.

A cell might be identified by a cell phone by the same unique ID used by a cellular network to identify the cell (assuming the cell phone has access to the full ID) or possibly by a combination of the cell ID as recognized by the cell phone along with an LAC (Location Area Code). Obviously the cell phone may use other variables it receives from surrounding cells base stations to uniquely identify a cell by either using one variable or a combination of variables.

The cell phone may further use the cellular network it self as one of the variables identifying a cell in order to avoid a case where two different cellular networks the cell phone is roaming between use the same IDs (as recorded by the cell phone) to identify their cells.

It should further be noted that even if cell IDs used by a cell phone will not be unique per cell (i.e. two or more cells in a cellular network will have the same ID as recorded by the cell phone), the odds of the cell phone recognizing two different locations as the same location are very low since it will require the same cell IDs to be used in two different areas and the same signal strengths to be recorded from the 'same' cells in two different locations.

Once the cell phone records the signal strengths measured by the cell phone from surrounding cells at a desired location, the combination of the recorded signal strengths from surrounding cells are used as the coordinates of the desired location.

It should be noted that there is no limit on the number of desired locations that could be recorded and tracked by the cell phone.

After the cell phone records the desired location coordinates (the combination of signal strengths from surrounding cells), the cell phone will check its location as reflected by the signal strengths from surrounding cells at specific time intervals (every 2 minutes for example) or at specific times (every 5 minutes during the day and every 15 minutes between 3 am and 6 am) or depending on the rate the user's location changes (if the user does not change its location for more than 60 minutes then the rate of checking the location can be reduced from every 5 minutes to every 20 minutes to save battery power) or at the occurrence of an event (such as the cell phone switching the base station it is registered with) or upon a request from the network to do so or upon a request from an application to do so or upon a request from the user to do so etc.

If the current location's surrounding cell IDs are different from the desired location's surrounding cell IDs then the cell phone does not need to continue the comparison, the current location is clearly not the desired location.

When the signal strengths from the cells surrounding the current location are identical to the signal strengths measured by the cell phone from the exact same cells (same cell IDs) at the desired location then the cell phone is determined to have returned to the desired location (i.e. current location=desired location) and the location based application which is pending the return of the cell phone to the desired location will be activated.

Having said that, when comparing the current location with the desired location, depending on the location based application, a threshold could be defined based on how close the current location should be to the desired location in order to activate the desired application.

The threshold could be a number that if the difference between two signal strengths measured by the cell phone from the same cell at the current location and the desired location is less than that number the measured signal strengths from the specific cell at the current location and the desired location would be considered similar.

If the difference between the measured signal strength at the current location and the measured signal strength from the same cell at the desired location for each of the surrounding cells is less than the threshold then the cell phone's current position will be considered the same as the desired location or within reasonable range and the location based application which is pending the return of the cell phone to the desired location or to its area will be activated.

In another implementation, it could further be defined that it is enough that the difference between the measured signal strength at the current location and the measured signal strength from the same cell at the desired location for at-least a pre-determined number of surrounding cells (3 cells for example) will be less than the threshold for the current location to be considered within reasonable range from the desired location and as a result to activate the location based application which its activation is pending the return of the cell phone to the area of the desired location.

In another implementation, it could further be defined that the at-least pre-determined number of cells described in the previous paragraph are those cells with the strongest measured signals.

It should be mentioned that while the more the signal strengths from more surrounding cells are taken into account, the more accurate the location determination is, a possible implementation might take into account as little as one signal strength (the strongest one) in order to determine whether the cell phone has returned to the area of the desired location.

In a different implementation, if the sum of the differences between measured signal strengths from the same cells at the current location and desired location is less than a pre-determined threshold then it will result in determining that the cell phone has returned to the desired location or the desired location area.

It is worthwhile to analyze the suggested method in a typical GSM implementation and a typical CDMA implementation.

In a typical GSM system, GMSK modulation is used on the BCCH (Broadcast Control Channel) carrier. The BCCH carrier is continuously transmitted and without variation of RF level. Cell phones measure the received signal level from surrounding cells by tuning and listening to their BCCH carriers. The measured signal strengths (levels) are used for handover purposes.

The suggested location-determining method is therefore ideal for GSM where surrounding cells BCCH carriers transmit at the same RF level at all times.

In a typical CDMA system such as a DS-CDMA (Direct Sequence CDMA), since all signals in a DS-CDMA system are sharing the same bandwidth and overlapping in time, the power levels of the signals transmitted by the cell phones (uplink) as well as the power level of the signals transmitted by the base station (downlink) are controlled to achieve acceptable signal-to-interference ratio (SIR) for all users (sometime it's also called C/I—Carrier to Interference ratio). Controlling the SIR helps maximize the system capacity by minimizing the probability for a call to be dropped due to a too low SIR.

While different algorithms for calculating downlink power allocation (i.e. the signal levels/strengths transmitted by a CDMA base station) exist, typically what's common to those different algorithms is the striving to achieve a minimal reasonable SIR for all cell phones connected to the base station where the noise component of the SIR at each of the cell phones is assumed to mainly be impacted by the signals transmitted by surrounding cells. Additionally, the sum of all signals transmitted by a base station to cell phones registered with the base station can not exceed the maximum power the base station transmitter is capable of.

The lower the signals transmitted by surrounding cells' base stations the better the reception at a cell's cell phones. Downlink power control aims to reduce the amount of interference in neighboring cells by adjusting the power of each cell's base station transmitter.

Substantially, this outlines an iterative process where the signal strengths transmitted by base stations of neighboring cells are correlated.

The question then, how would the location determination method described here handle measured signal strengths of surrounding cells that vary as a function of cell phone traffic in a CDMA system?

One way could be to have the cell phone record signal strengths at a desired location at different times of day at different days of the week since cell phone traffic at cells is known to have a repetitive pattern. For example, on Monday between 12 pm and 2 pm people will use their cell phone to make and receive calls at a specific cell in approximately the same way as they will use their cell phones on the following Mondays between 12 pm and 2 pm, which means that the downlink transmitted power by this cell and the neighboring cells will be approximately the same on Monday between 12 pm and 2 pm as well as on the following Mondays between 12 pm and 2 pm since the downlink power is a function of cell phone traffic and the downlink transmitted power of neighboring cells is correlated.

Having said that, ideally a user will identify a desired location to the cell phone only once at one point in time and will not need to repeat the identification of the desired location in different times.

Taking into account the correlation of downlink transmitted signals of neighboring cells, by calculating the relations between the measured signal strengths of neighboring cells, a cell phone can identify that it returned to a desired location by comparing the calculated relations between neighboring cells at current location with the calculated relations between neighboring cells at the desired location. Since the correlation between downlink transmitted signals by cells' base stations is among neighboring cells and a cell phone will not know which of the measured signals belong to neighboring cells and which to non-neighboring cells, in one suggested implementation the cell phone can assume that the cells transmitting the strongest signals are the cells closest to the cell phone and therefore neighboring cells. The cell phone will therefore take into account only the signal strengths of the cells transmitting the strongest signals as those cells will be assumed neighboring cells by the cell phone, therefore their signals correlated and therefore the relations between those cells' signals will represent the cell phone's location. The number of cells assumed neighboring cells could vary depending on factors such as total number of signal strengths measured by the cell phone that could indicate whether the cell phone is in an urban area or in a rural area or a measured signal strength exceeding a threshold calculated by dividing a measured signal strength by the strongest measured signal at the current location etc.

An example of the above suggested implementation will be—a location is identified to the cell phone as a desired location by the cell phone owner.

The cell phone measures the signal strengths of surrounding cells. The cell phone measures 10 signals from 10 surrounding cells. The cell phone chooses the 4 cells with the strongest signals as neighboring cells (cells #1, 4, 6, 9). The cell phone calculates the ratio between the chosen 4 signals by dividing the 3 less strong signals by the strongest signal (assuming that cell #4 has the strongest signal). The cell phone records the 3 relations (cell #1 signal/cell #4 signal, cell #6 signal/cell #4 signal and cell #9 signal/cell #4 signal). The cell phone may further record the measured signal strengths of the 4 chosen cells. From that point in time onward, the cell phone checks to see if signals from unique cells #1, 4, 6 and 9 can be measured by the cell phone. If the cell phone can measure signals from cells #1, 4, 6 and 9, the cell phone calculates the relations between cells #1, 6 and 9 to cell #4. If the calculated relations at the current location are identical to the recorded relations the cell phone determines that it has returned to the desired location. The cell phone can determine that it has returned to the desired location or to an area close enough to be considered the desired location by subtracting each of the relations at the current location from each of the corresponding relations at the desired location and demanding that the each of the subtraction for each of the relations does not exceed a certain threshold or that the sum of the subtractions does not exceed a certain threshold or alternatively any other formula.

The above example assumes that one cell (cell #4 in the above example) will always have the strongest signal at the desired location (while the signal of cell #4 will vary as a function of number of subscribers at neighboring cells the assumption is it will always be relatively the strongest). This assumption will not be true in the case the cell phone is located at equal distances to the base stations of 2 cells' base stations—cell #4 and cell #1. The cell phone might be registered with cell #4 at 2 pm on Monday when the number of subscribers at cell #1 is very high and the number of subscribers at cell #4 is low but at 7 pm the same day when the number of subscribers at cell #1 will be low and the number of subscribers at cell #4 will be very high the cell phone will be registered with cell #1 at the same physical location. Accordingly, if the cell phone would have measured the signal strengths at 2 pm and 7 pm cell #4 signal would have come stronger only at 2 pm while at 7 pm the signal of cell #1 would have come stronger. We therefore need to accommodate this case in the location determination algorithm when used in a CDMA system or other systems with the same characteristics. When a cell phone is on the border of 2 cells, the signals as measured by the cell phone will be close to each other. In one possible implementation the algorithm can allow a higher threshold (which will make relations not as close when subtracted still less than the threshold that was made higher). In another possible implementation the cell phone can divide the signal strength of the chosen cells not by the signal of the strongest cell but by the sum of the signals of the 2 strongest cells if the two strongest cells are close enough in strength. For example, if at 2 pm the signal strength of cell #4 is only slightly stronger than the signal strength of cell #1, the cell phone will calculate the following relations: [0135]cell #6 signal/(cell #4 signal+cell #1 signal) [0136]cell #9 signal/(cell #4 signal+cell #1 signal)

Obviously, the above are just suggested implementations and other possible implementations using other formulas are possible.

It was mentioned that more measurements taken at the desired location at different points in time could help improve the location determination. It was further mentioned that the user will ideally identify a location as a desired location to a cell phone only once. Since in many cases a desired location is a user's home or office and after the identification of a location as a desired location the user stays in that location for several hours, a cell phone can continue and measure signal strengths at a desired location hours after the location was identified to the cell phone as a desired location.

The cell phone will be able to determine that it is still at the desired location by measuring the rate the measured signal strengths change and the relations among them. When a user walks or drives the rate a signal strength of a specific cell changes will be faster than if the user stayed in one place. The relations between the signal strengths of surrounding cells will also change when the user walks or drives away from the desired location. The above therefore enable a cell phone to gather more measurements at the desired location at different points in time without requiring the user to identify a place as a desired location more than once.

The suggested method will also be able to recognize changes in the cellular network such as the addition of a new cell or the cancellation of a cell or a retune of the network since the changes will mainly be reflected in one or two measured cells' signal strengths or the relations of one or two measured signal strengths to the strongest measured signal etc.

It should be noted that depending on the desired accuracy, the range from the desired location that within the location pending service will still be activated and so forth, different formulas and methods other than the described above might be devised to do the comparison between the measured signal strengths as measured by the cell phone from surrounding cells at the current location and desired location.

While the preferred embodiment refers to signal strengths that any cell phone can measure today, cellular networks might decide to use the described invention by using other parameters that they will make available to cell phones.

Such parameters could be for example as follows—a cellular network will broadcast from all base stations a signal which will be synchronized among the base stations (the base stations could be synchronized using GPS signals). A cell phone will measure the time the same signal will arrive from surrounding cells at a current location. The different arrival times of the same signal will reflect the distance of the cell phone to the surrounding cells. Those arrival times could be recorded by the cell phone as the coordinates of a desired location.

The same way, the cell phone recorded, measured and compared signal strengths from surrounding cells, the cell phone will record, measure and compare the arrival times from surrounding cells of the synchronized signal.

Alternatively, a cellular network may decide to send the same synchronized signal from all base stations and the cell phone will measure the phase the signals will arrive to the cell phone with from the surrounding cells and the combination of signal phases will be used as coordinates of locations.

The same way, the cell phone recorded, measured and compared signal strengths from surrounding cells, the cell phone will record, measure and compare the phases of arriving signals from surrounding cells of the synchronized signal.

It should be noted that these are just examples, the cellular networks may decide to make another parameter or combination of parameters available to cell phones and the cell phones could use the combination of measured parameters from surrounding cells as coordinates of a location.

While the above embodiments describe the usage of the invention for cell phones, the invention can clearly be used in other embodiments where a wireless phone can choose between several networks to connect to, which means that the wireless phone can measure the signal strengths of several surrounding networks (or other parameters made available by the networks to the wireless phone).

An example of the above will be WiFi hot spots where a wireless phone can choose between connecting to any of several surrounding WiFi hot spots. The wireless phone could measure the signal strengths of the surrounding WiFi networks and use the recorded signal strengths as a unique fingerprint of its location.

Another example will be a phone that combines WiFi and cellular by routing a call over a WiFi network or a cellular network. Such a phone can measure not only the signal strengths of the surrounding cells but also the signal strengths of surrounding WiFi networks where the combined measurements of surrounding WiFi networks and cells will possibly provide a more accurate location representation. Obviously, the formula used by the phone to combine the measurements of the WiFi networks signal strengths and the cells signal strengths could vary based on the desired accuracy, used cellular communication protocols (GSM or CDMA or other) etc, A further example, WiMax networks where a wireless phone can choose between connecting to any of several surrounding WiMax networks. The wireless phone could measure the signal strengths of the surrounding WiMax networks and use the recorded signal strengths as a unique fingerprint of its location.

The invention could also be implemented in a phone combining measurements of signal strengths (or other parameters made available by networks) from several different networks including cellular networks, WiFi networks and WiMax networks.

While the invention has been described with respect to specific examples including presently preferred modes of carrying out the invention, those skilled in the art will appreciate that there are numerous variations and permutations of the Signal-Comparison Based Location-Determining Method, described systems, and techniques that fall within the spirit and scope of the invention as set forth in the appended claims. By non-limiting example, we mention that for purposes of establishing a location fingerprint (coordinate reference) today's cellular telephone in juxtaposition to established local area base station service antennas is substantially equivalent to a RF communications enabled ubiquitous computer in communications with fixed respective base stations antennas; or the likes. Hence, the references to a cellular telephone in the preferred embodiment may be easily extended to any device capable of receiving and measuring a plurality of EMF signals—and therewith to comply with the other aspects to the instant invention.

While privacy wise, it is preferable to measure signals, record, them, and compare them—all respectively on a portable device per se, there are many cultures that are less concerned with personal privacy issues. In such circumstances, any or all of the steps may be performed from the perspective of service area antenna(s) coordinated by server communications there between. The real distinction is that the instant invention embodiments determine that one is at a specific location from a comparison of signal strengths or like characteristics made at the same location.

In addition, the instant invention relates to embodiments (and Mutatis Mutandis to all of the aforementioned instant invention embodiment variations thereof) of A Signal-Comparison Based Location-Determining Method, operable by at least one portable RF communications device in conjunction with at least two fixed-location service-area antenna stations respectively capable of RF communication with the at least one device wherein the stations are substantially continuously operating, and the method is comprising the steps of:

(A) First-Causing a portable RF communications device at a selected location to receive an RF communications signal from a plurality of local fixed-location GSM service-area antenna stations;

(B) First-Measuring reception signal strength respectively associated with the "First-Causing" received signal from at least two of the plurality of antenna stations;

(C) Second-Causing a portable RF communications device to receive an RF communications signal from a plurality of local fixed-location GSM service-area antenna stations;

(D) Second-Measuring reception signal strength respectively associated with the "Second-Causing" received signals; and (E) Determining, if the portable RF communications device of the "Second-Causing" step is at the selected location of the "First-Causing" step, By electronically Comparing at least two of the respective reception signal measurements of the "First-Measuring" step with at least two of the respective reception signal measurements of the "Second-Measuring" step.

Furthermore, the instant invention also relates to embodiments (and Mutatis Mutandis to all of the aforementioned instant invention embodiment variations thereof) of A Signal-Comparison Based Location-Determining Method, operable by at least one portable RF communications device in conjunction with at least two fixed-location service-area antenna stations respectively capable of RF communication with the at least one device wherein the stations are substantially continuously operating, and the method is comprising the steps of:

(A) First-Causing a portable RF communications device at a selected location to receive an RF communications signal from a plurality of local fixed-location CDMA service-area antenna stations;

(B) First-Measuring reception signal strength respectively associated with the "First-Causing" received signal from at least two of the plurality of antenna stations and therewith calculating respectively relative signal reception strengths;

(C) Second-Causing a portable RF communications device to receive an RF communications signal from a plurality of local fixed-location CDMA service-area antenna stations;

(D) Second-Measuring reception signal strength respectively associated with the "Second-Causing" received signals and therewith calculating respectively relative signal reception strengths; and (E) Determining, if the portable RF communications device of the "Second-Causing" step is at the selected location of the "First-Causing" step, By electronically Comparing at least one of the calculated respective relative reception signal strengths of the "First-Measuring" step with at least one of the calculated respective relative reception signal strengths of the "Second-Measuring" step.

Likewise, Mutatis Mutandis to all of the aforementioned instant invention embodiments and variations thereof, determinations that are based on derivatives, integrals, statistical metrics, mathematical normalizations, correlation functions, heuristic convolution functions, or the likes—are substantially consistent with the "pith and marrow" of the instant invention—because the embodiments of the instant invention are designated for the purpose of knowing a geographical location by comparing a previously known antenna space measurement (at location "1") with a current antenna space measurement (performed at location "2"), and deciding if the location of the current measurement ("2") is to be considered as being within a nominal distance from the known measurement (at "1"). Simply stated, the instant invention is verifying that a portable RF reception device is at a geographical location—if it reasonably corresponds to a known antenna space measurement for that location.

In describing the present invention, explanations are presented in light of currently accepted telecommunications theories and communications enabled ubiquitous computing models. Such theories and models are subject to changes, both adiabatic and radical. Often these changes occur because representations for fundamental component elements are innovated, because new transformations between these elements are conceived, or because new interpretations arise for these elements or for their transformations. Therefore, it is important to note that the present invention relates to specific technological actualization in embodiments. Accordingly, theory or model dependent explanations herein, related to these embodiments, are presented for the purpose of teaching, the current man of the art how these embodiments may be substantially realized in practice. Alternative or equivalent explanations for these embodiments may neither deny nor alter their realization.

Furthermore, numbers, alphabetic characters, and roman symbols as designated herein are for convenience of explanations only, and should by no means be regarded as imposing particular order on any method steps.

Industrial Applicability

Technical Issues: For mobile telephone devices, an ability to measure signal strength of signals received from local service area antennas and an ability to extract respective ID data from such signals is a self-evident feature. Furthermore, the mobile telephone device generally has a reasonable amount of spare computing power onboard. Thus, for the mobile telephone device and for many other RF enabled communication reception with computing capability devices, the method of the present invention is straightforward to configure using existing off-the-shelf technological components.

Ergonomic Issues: The present method allows for user privacy by choice; a feature that is not available at a comparable cost—since a cell phone with a GPS costs more than a cell phone without a GPS.

Economic Issues: The present method can be implemented on any cheap cell phone which does not include a GPS, thereby bringing location based services to the masses by reducing the price of the location determining method used by the phone. Furthermore, the present method facilitates emergency location reporting in many places where GPS fails; a feature that can not be expressed in finite monetary terms.

What is claimed is:

1. A signal-comparison based location-determining method, operable by a first portable RF communications device in conjunction with a plurality of fixed-location service-area antenna stations capable of RF communication with the first portable RF communications device wherein the antenna stations are substantially continuously operating, the method comprising:
    (a) the first portable RF communications device monitoring its location by (i) receiving communications signals from a first plurality of the antenna stations, (ii) identifying at least one ID within at least one of the received communications signals, and (iii) measuring the signal strengths associated with a received communications signal from the first plurality of antenna stations; and
    (b) the first portable RF communication device determining if a monitored location is within proximity of a location chosen by a user of the first portable RF communication device, as a result of (i) electronically comparing the at least one ID and at least one figure based on the signal strengths of the first plurality of antenna stations at the monitored location with the at least one ID and the at least one figure based on signal strengths of the first plurality of antenna stations at the location chosen by the user, and (ii) determining if the difference between the signal strengths measured at the monitored location and the signal strengths at the location chosen by the user is less than a predetermined threshold.

2. The method of claim 1 wherein the chosen location signal strengths were measured by the first portable RF communication device.

3. The method of claim 1 wherein the chosen location signal strengths were measured by a second portable RF communication device, different from the first portable RF communication device.

4. The method of claim 1 wherein the chosen location signal strengths and at least one ID originated from a database of geographic locations and corresponding signal strengths and IDs.

5. The method of claim 4 wherein the database is stored remotely, and not on the first portable RF communication device.

6. The method of claim 5 wherein the database is built by a service provider.

7. The method of claim 4 wherein the database is built based on multiple locations, where for each location, GPS measurements and signal strength measurements are performed and the IDs of nearby antenna stations of the plurality of antenna stations are recognized.

8. The method of claim 7 wherein at least for some of the locations, signal strength measurements are taken at different times.

9. The method of claim 7 wherein the signal strength measurements are taken using a portable RF communication device.

10. The method of claim 9 wherein the signal strength measurements or calculation results made using the signal strength measurements, along with the antenna station IDs, are sent by the portable RF communication device to a server responsible for building the database of geographic locations and corresponding signal strengths and antenna stations IDs.

11. The method of claim 4 wherein the chosen location signal strengths and at least one ID is taken from the database of geographic locations and corresponding signal strengths and IDs using a geographic location entered by the first portable RF communication device user as the location chosen by the user.

12. The method of claim 4 wherein the chosen location signal strengths and at least one ID, which corresponds with a geographical location chosen by the first portable RF communication device user, is the result of extrapolating the signal strengths of locations in the database of geographic locations and corresponding signal strengths and IDs.

13. The method of claim 4 wherein the chosen location signal strengths and at least one ID, which corresponds with a geographical location chosen by the first portable RF communication device user, is taken from the database of geographic locations and corresponding signal strengths and IDs, said database being built using computational closure.

14. The method of claim 1 wherein the at least one ID is a cell ID.

15. The method of claim 1 wherein the first portable RF communication device is a mobile phone.

16. The method of claim 1 wherein the first portable RF communication device is a ubiquitous computer.

17. The method of claim 1 wherein the monitoring step comprises 'low accuracy monitoring' and 'high accuracy monitoring'.

18. The method of claim 17 wherein 'low accuracy monitoring' includes comparing the chosen location IDs with the current location IDs.

19. The method of claim 18 wherein 'high accuracy monitoring' takes place only if the current location IDs are determined to match the chosen location IDs in the 'low accuracy monitoring' step.

20. The method of claim 19 wherein 'high accuracy monitoring' includes measuring a signal strength at the current location.

21. The method of claim 1 wherein the monitoring step is performed iteratively, with a predetermined time delay between successive iterations such that data from the monitoring step is used only if a substantial portion of the successive measurements are alike within a predetermined threshold.

22. The method of claim 1 wherein the 'at least one figure based on the signal strengths' is the signal strengths, for both the monitored location and the chosen location.

23. The method of claim 1 wherein the 'at least one figure based on the signal strengths of the first plurality of antenna stations' is a figure based on a calculation using the signal strengths of the first plurality of antenna stations.

24. The method of claim 1 wherein determining if the monitored location is within proximity of a location chosen by the user of the first portable RF communication device further includes informing a location-based software program application running on the portable device that the device is at the location chosen by the user or is no longer at the location chosen by the user.

25. The method of claim 1 wherein determining if the monitored location is within proximity of a location chosen by the user of the first portable RF communication device further includes launching a location-based software program application on the portable device when the device is at the location chosen by the user.

26. The method of claim 1 wherein the determining of part (b) starts taking place or stops taking place at one or more of the following: (i) at specific time intervals, or (ii) at specific times, or (iii) depending on the rate the user's location changes, or (iv) at the occurrence of an event, or (v) upon a request from the network, or (vi) upon a request from a software application on the device, or (vii) upon a request from the user.

27. The method of claim 26 wherein the determining of part (b) starts taking place or stops taking place at the occurrence of an event, and wherein the event is the device switching from one to another of the antenna stations with which it is registered.

28. The method of claim 27 wherein the antenna station with which the device is registered is a cell base station.

29. The method of claim 27 wherein the antenna station with which the device is registered is a WiFi base station.

30. The method of claim 1 wherein the at least one ID is a WiFi network ID.

31. A signal-comparison based location-determining system, comprising:
(a) a first portable RF communications device communicating with a plurality of fixed-location service-area antenna stations capable of RF communication with the first portable RF communications device, wherein the antenna stations are substantially continuously operating;
(b) software residing on the first portable RF communications device, said software causing the first portable RF communications device to monitor its location by (i) receiving communications signals from a first plurality of the antenna stations, (ii) identifying at least one ID within at least one of the received communications signals, and (iii) measuring signal strengths associated with a received communications signal from the first plurality of antenna stations; and
(c) software residing on the first portable RF communication device, said software causing the first portable RF communication device to determine if the monitored location is within proximity of a location chosen by a user of the first portable RF communication device, as a result of (i) electronically comparing the at least one ID and at least one figure based on the signal strengths of the first plurality of antenna stations at the monitored location with the at least one ID and at least one figure based on signal strengths of the first plurality of antenna stations at the location chosen by the user, and (ii) determining if the difference between the signal strengths measured at the monitored location and the signal strengths at the location chosen by the user is less than a predetermined threshold.

* * * * *

UNITED STATES PATENT AND TRADEMARK OFFICE
CERTIFICATE OF CORRECTION

| | | |
|---|---|---|
| PATENT NO. | : 8,170,583 B2 | Page 1 of 1 |
| APPLICATION NO. | : 12/720362 | |
| DATED | : May 1, 2012 | |
| INVENTOR(S) | : Roy Shkedi | |

It is certified that error appears in the above-identified patent and that said Letters Patent is hereby corrected as shown below:

Column 26, Line 46, change "5" to --4--

Signed and Sealed this
Nineteenth Day of June, 2012

David J. Kappos
*Director of the United States Patent and Trademark Office*